US012773011B2

(12) United States Patent
Lochtman et al.

(10) Patent No.: US 12,773,011 B2
(45) Date of Patent: Oct. 27, 2026

(54) AEROSOL PROVISION DEVICE HEATING SYSTEM

(71) Applicant: Nicoventures Trading Limited, London (GB)

(72) Inventors: Daniel Lochtman, London (GB); David Bureau, London (GB); James Sheridan, London (GB)

(73) Assignee: Nicoventures Trading Limited, London (GB)

( * ) Notice: Subject to any disclaimer, the term of this patent is extended or adjusted under 35 U.S.C. 154(b) by 492 days.

(21) Appl. No.: 18/248,299

(22) PCT Filed: Oct. 15, 2021

(86) PCT No.: PCT/EP2021/078671
§ 371 (c)(1),
(2) Date: Apr. 7, 2023

(87) PCT Pub. No.: WO2022/079275
PCT Pub. Date: Apr. 21, 2022

(65) Prior Publication Data

US 2023/0371603 A1 Nov. 23, 2023

(30) Foreign Application Priority Data

Oct. 16, 2020 (GB) .................................... 2016483

(51) Int. Cl.
*A24F 40/465* (2020.01)
*A24F 40/20* (2020.01)
(Continued)

(52) U.S. Cl.
CPC ............ *A24F 40/465* (2020.01); *A24F 40/20* (2020.01); *A24F 40/46* (2020.01); *A24F 40/57* (2020.01); *H05B 6/108* (2013.01)

(58) Field of Classification Search
CPC ........ A24F 40/465; A24F 40/46; A24F 40/20; A24F 47/00; H05B 6/105; H05B 6/36
See application file for complete search history.

(56) References Cited

U.S. PATENT DOCUMENTS

2016/0295921 A1* 10/2016 Mironov et al. ....... A24B 15/12
2019/0357593 A1 11/2019 Chau et al.
2022/0175015 A1* 6/2022 Jeong et al. .......... A24F 40/465

FOREIGN PATENT DOCUMENTS

CN 109363244 A 2/2019
EP 3469936 A2 4/2019
(Continued)

OTHER PUBLICATIONS

International Search Report and Written Opinion received for PCT Patent Application No. PCT/EP2021/078671, mailed on Feb. 11, 2022, 11 pages.
(Continued)

*Primary Examiner* — Christopher M Rodd
*Assistant Examiner* — Ronnie Kirby Jordan
(74) *Attorney, Agent, or Firm* — MERCHANT & GOULD P.C.

(57) ABSTRACT

An aerosol provision device heating system is described. The system includes a heating region that can receive at least a portion of an article including aerosol generating material. The system also includes a first heating element that extends within a first portion of the heating region, and a second heating element that at least partially surrounds a second portion of the heating region. In some arrangements, at least part of the first heating element extending within the heating region is offset from the second heating element. In some arrangements, most of the second heating element is offset from the first heating element.

22 Claims, 8 Drawing Sheets

(51) Int. Cl.

| | |
|---|---|
| ***A24F 40/46*** | (2020.01) |
| ***A24F 40/57*** | (2020.01) |
| ***H05B 6/10*** | (2006.01) |

(56) References Cited

FOREIGN PATENT DOCUMENTS

| | | | | |
|---|---|---|---|---|
| JP | 2019134701 | A | 8/2019 | |
| JP | WO2020153829 | A1 * | 7/2020 | ........... A24F 40/465 |
| KR | 1020190093147 | A | 8/2019 | |
| KR | 1020200069112 | A | 6/2020 | |
| WO | 2019192028 | A1 | 10/2019 | |
| WO | 2020/064683 | A1 | 4/2020 | |
| WO | 2020/064684 | A1 | 4/2020 | |
| WO | 2020182733 | A1 | 9/2020 | |

OTHER PUBLICATIONS

Korean Patent Application No. 10-2023-7011448, Notice to File a Response, mailed Jun. 11, 2025, 20 pages.

Japanese Patent Application No. 2023520441, Notice of Reasons for Rejection, mailed Apr. 23, 2024, 13 pages.

* cited by examiner

AEROSOL PROVISION DEVICE HEATING SYSTEM

PRIORITY CLAIM

The present application is a National Phase entry of PCT Application No. PCT/EP2021/078671, filed Oct. 15, 2021, which claims priority from GB Application No. 2016483.6, filed Oct. 16, 2020, each of which hereby fully incorporated herein by reference.

TECHNICAL FIELD

The present disclosure relates to an aerosol provision device heating system for an aerosol provision device, an aerosol provision device and an aerosol provision system comprising an aerosol provision device and an article comprising aerosol generating material.

BACKGROUND

Smoking articles such as cigarettes, cigars and the like burn tobacco during use to create tobacco smoke. Attempts have been made to provide alternatives to these articles that burn tobacco by creating products that release compounds without burning. Examples of such products are heating devices which release compounds by heating, but not burning, the material. The material may be for example tobacco or other non-tobacco products, which may or may not contain nicotine.

SUMMARY

According to an aspect, there is provided an aerosol provision device heating system, comprising: a heating region configured to receive at least a portion of an article comprising aerosol generating material; a first heating element that extends within a first portion of the heating region, the first heating element being heatable to heat the first portion of the heating region; and a second heating element that at least partially surrounds a second portion of the heating region, the second heating element being heatable to heat the second portion of the heating region; wherein at least part of the first heating element extending within the heating region is offset from the second heating element.

The at least part of the first heating element extending within the heating region that is offset from the second heating element should be not surrounded by the second heating element.

Another part of the first heating element extending within the heating region may be surrounded by the second heating element or none of the first heating element extending within the heating region may be surrounded by the second heating element.

The first heating element may extend within the heating region at an end of the heating region. The first heating element may protrude into the first portion of the heating region from an (the) end of the heating region.

The first heating element may define a longitudinal axis, and the at least part of the first heating element extending within the heating region may be offset in an axial direction (i.e. a direction parallel to the longitudinal axis of the first heating element) from the second heating element.

The offset may be such that the at least part of the first heating element extending within the heating region does not overlap the second heating element in the axial direction. Another part of the first heating element extending within the heating region may overlap the second heating element in the axial direction or none of the first heating element extending within the heating region may overlap the second heating element in the axial direction.

The heating region may have a longitudinal axis. The first heating element may extend within the heating region in the axial direction (i.e. parallel to the longitudinal axis of the heating region). The first heating element may extend within the heating region along the longitudinal axis of the heating region.

The second heating element may at least partially extend around the longitudinal axis of the heating region.

The first and second heating elements may be coaxial.

The first heating element may extend within the article. The first heating element may be configured to extend into the article when the article is received by the heating region.

The first heating element may comprise a sharp edge or point at a free end.

The second heating element may comprise a substantially tubular member that surrounds the second portion of the heating region.

The second heating element may comprise one or more discontinuities.

The one or more discontinuities may be configured to allow a varying magnetic field to pass therethrough.

The second heating element may be configured to extend around at least a portion of the article when the article is received by the heating region.

The heating system may comprise a receptacle defining the heating region. The receptacle may have a base defining an (the) end of the heating region and peripheral wall.

The first heating element may upstand from the base.

The peripheral wall may comprise a support member and the second heating element.

The second heating element may be supported by the support member forming at least part of the peripheral wall.

The support member may comprise a recess extending from an inner surface, and the second heating element may be in the recess.

The at least a part of the first heating element extending within the heating region that is offset from the second heating element may be arranged at an (the) end of the heating region.

The at least a part of the first heating element extending within the heating region that is offset from the second heating element may be at least a majority (that is, most or all) of the first heating element extending within the heating region.

The at least a majority of the first heating element extending within the heating region may be more than 50%, more than 75%, more than 90%, more than 95%, or substantially 100% of the axial length of the first heating element that extends within the heating region.

At least a majority (that is, most or all) of the second heating element may be offset from the first heating element.

According to an aspect, there is provided an aerosol provision device heating system, comprising: a heating region configured to receive at least a portion of an article comprising aerosol generating material; a first heating element that extends within a first portion of the heating region, the first heating element being heatable to heat the first portion of the heating region; and a second heating element that at least partially surrounds a second portion of the heating region, the second heating element being heatable to heat the second portion of the heating region; wherein at least a majority of the second heating element is offset from the first heating element.

The heating system of this aspect can include one or more, or all, of the features described above, as appropriate.

The at least a majority of the second heating element that is offset from the first heating element should not surround the first heating element. The offset may be such that the at least a majority of the second heating element does not overlap the first heating element in the axial direction.

A minority of the second heating element may surround the first heating element or none of the second heating element may surround the first heating element. A minority of the second heating element may overlap the first heating element in the axial direction or none of the second heating element may overlap the first heating element in the axial direction.

The at least a majority of the second heating element may be more than 50%, more than 75%, more than 90%, more than 95%, or substantially 100% of the axial length of the second heating element.

The first heating element may be arranged at an (the) end of the heating region. The end of the heating region may be a first end of the heating region. The at least a majority of the second heating element that is offset from the first heating element may be arranged at or towards a second end of the heating region.

The first end of the heating region may be a first axial end of the heating region. The second end of the heating region may be the other axial end of the heating region. The first end may be a distal end of the heating region, and the second end may be a proximal end of the heating region.

The first heating element may extend over at least a first distance between the first, distal end of the heating region and the free, proximal end of the first heating element. The second heating element may extend over a second distance between a first, distal end of the second heating element and a second, proximal end of the second heating element. The first and second heating elements may be offset from each other such that a distance from the first, distal end of the heating region to the second, proximal end of the second heating element is greater than the first distance and is greater than the second distance.

According to an aspect, there is provided an aerosol provision device heating system, comprising: a heating region configured to receive at least a portion of an article comprising aerosol generating material; a first heating element that extends within a first portion of the heating region at an end of the heating region, wherein the first heating element extends over at least a first distance between the end of the heating region and an end of the first heating element; and a second heating element that at least partially surrounds a second portion of the heating region, wherein the second heating element extends over a second distance between a first end of the second heating element and a second end of the second heating element; wherein the first and second heating elements are offset from each other such that a distance from the end of the heating region to the second end of the second heating element is greater than the first distance and is greater than the second distance.

The heating system of this aspect can include one or more, or all, of the features described above, as appropriate.

The first distance may be an axial distance. The second distance may be an axial distance. The distance from the (first) end of the heating region to the second end of the second heating element may be an axial distance.

The (free) end of the first heating element may be at or towards the second end of the heating region. The (free) end of the first heating element may be a proximal end of the first heating element. The other, distal end of the first heating element may be at the first end of the heating region, or may extend beyond the first end of the heating region. The first end of the second heating element may be at or towards the first end of the heating region. The first end of the second heating element may be a distal end of the second heating element. The second end of the second heating element may be at or towards the second end of the heating region. The second end of the second heating element may be a proximal end of the second heating element.

The first distance may be: i) ≤40 mm; ii) ≤35 mm; iii) ≤30 mm; iv) ≤25 mm; v) ≤20 mm; vi) ≤15 mm; vii) ≤10 mm; or viii) ≤5 mm.

The second distance may be: i) ≤40 mm; ii) ≤35 mm; iii) ≤30 mm; iv) ≤25 mm; v) ≤20 mm; vi) ≤15 mm; vii) ≤10 mm; or viii) ≤5 mm.

The distance from the (first) end of the heating region to the second end of the second heating element may be: i) >10 mm; ii) >20 mm; iii) >30 mm; iv) >40 mm; v) >50 mm; vi) >60 mm; vii) 70 mm; or viii) >80 mm.

The first and second heating elements may be offset from each other such that the second heating element does not surround the first heating element. The first and second heating elements may be offset from each other such that the second heating element does not overlap the first heating element in the axial direction.

A distance from the (free) end of the first heating element to the first end of the second heating element may be: i) <10 mm; ii) <5 mm; iii) <2 mm; iv) <1 mm; or v) substantially 0 mm.

The first heating element may comprise a first resistive heating element heatable by electrical current. The second heating element may comprise a second resistive heating element heatable by electrical current. The system may comprise electrical contacts for (directly) supplying electrical current to the first and/or second resistive heating elements.

The first heating element may comprise a first susceptor heatable by penetration with a varying magnetic field. The second heating element may comprise a second susceptor heatable by penetration with a varying magnetic field.

The system may comprise an induction coil configured to generate a varying magnetic field that penetrates the first and second susceptors. The induction coil may extend around at least a portion of the first susceptor and at least a portion of the second susceptor.

The system may comprise a first induction coil configured to generate a first varying magnetic field that penetrates the first susceptor and a second induction coil configured to generate a second varying magnetic field that penetrates the second susceptor. The first induction coil may extend around at least a portion of the first susceptor and the second induction coil may extend around at least a portion of the second susceptor.

The induction coil or the first and/or second induction coil may extend around at least a portion of the heating region. The induction coil or the first and/or second induction coil may extend around the longitudinal axis of the heating region. The first and second induction coils may be coaxial.

The first induction coil may extend around a greater axial length of the first susceptor than the second susceptor. The second induction coil may extend around a greater axial length of the second susceptor than the first susceptor.

The first and second heating elements may be independently controllable.

The system may comprise a control circuit configured to independently control the first and second heating elements.

The system may comprise a first sensor configured to determine a first temperature indicative of a temperature of the first heating element. The system may comprise a second sensor configured to determine a second temperature indicative of a temperature of the second heating element. The control circuit may be configured to control the first heating element based on the first temperature, and to control the second heating element based on the second temperature.

The aerosol generating material may be non-liquid aerosol generating material.

The heating region may be configured to receive at least a portion of an article comprising non-liquid aerosol generating material, and the heating system may be configured to heat the non-liquid aerosol generating material.

The heating system may be configured to heat the first and/or second heating elements to a temperature of between about 200 and about 350° C., such as between about 240° C. and about 300° C., or between about 250° C. and about 280° C.

According to an aspect, there is provided an aerosol provision device heating system, comprising: a heating region configured to receive at least a portion of an article comprising aerosol generating material; a first heating element that extends within a first portion of the heating region, the first heating element being heatable to heat the first portion of the heating region; and a second heating element that at least partially surrounds a second portion of the heating region, the second heating element being heatable to heat the second portion of the heating region; wherein at least a majority of the second heating element does not surround the first heating element and/or wherein at least part of the first heating element extending within the heating region is not surrounded by the second heating element.

The heating system of this aspect can include one or more, or all, of the features described above, as appropriate.

According to an aspect, there is provided an aerosol provision device comprising the heating system described above.

The aerosol provision device may be a non-combustible aerosol provision device.

The device may be a tobacco heating device, also known as a heat-not-burn device.

According to an aspect, there is provided an aerosol provision system comprising an aerosol provision device described above, and an article comprising aerosol generating material.

The aerosol generating material may be non-liquid aerosol generating material.

The article may be dimensioned to be at least partially received within the heating region.

The article may be dimensioned to be at least partially received within the second heating element.

The article may be dimensioned to be in contact with the second heating element when received within the second heating element. The article may be dimensioned to be pierced at one end by the first heating element.

According to an aspect, there is provided an aerosol provision device heating system, comprising: a heating region configured to receive at least a portion of an article comprising aerosol generating material; a first heating element that extends within a first portion of the heating region, the first heating element being heatable to heat the first portion of the heating region; and a second heating element that at least partially surrounds a second portion of the heating region, the second heating element being heatable to heat the second portion of the heating region; wherein at least part of the second heating element extending within the heating region axially overlaps the first heating element.

The second heating element may comprise one or more discontinuities.

The one or more discontinuities may be configured to allow a varying magnetic field to pass therethrough.

The at least part of the second heating element extending within the heating region that axially overlaps the first heating element may comprise the one or more discontinuities.

The at least part of the second heating element that is axially spaced from the first heating element may not comprise the one or more discontinuities.

According to an aspect, there is provided an aerosol provision device heating system, comprising: a heating region configured to receive at least a portion of an article comprising aerosol generating material; a first heating element that extends within a first portion of the heating region, the first heating element being heatable to heat the first portion of the heating region; and a second heating element that at least partially surrounds a second portion of the heating region, the second heating element being heatable to heat the second portion of the heating region.

BRIEF DESCRIPTION OF THE DRAWINGS

Various embodiments will now be described, by way of example only, and with reference to the accompanying drawings in which.

DETAILED DESCRIPTION

As used herein, the term “aerosol generating material” includes materials that provide volatilized components upon heating, typically in the form of an aerosol. Aerosol generating material includes any tobacco-containing material and may, for example, include one or more of tobacco, tobacco derivatives, expanded tobacco, reconstituted tobacco or tobacco substitutes. Aerosol generating material also may include other, non-tobacco, products, which, depending on the product, may or may not contain nicotine. Aerosol generating material may for example be in the form of a solid, a liquid, a gel, a wax or the like. Aerosol generating material may for example also be a combination or a blend of materials. Aerosol generating material may also be known as “smokable material”.

Apparatus is known that heats aerosol generating material to volatilize at least one component of the aerosol generating material, typically to form an aerosol which can be inhaled, without burning or combusting the aerosol generating material. Such apparatus is sometimes described as an “aerosol generating device”, an “aerosol provision device”, a “heat-not-burn device", a "tobacco heating product device" or a "tobacco heating device" or similar. Similarly, there are also so-called e-cigarette devices, which typically vaporize an aerosol generating material in the form of a liquid, which may or may not contain nicotine. The aerosol generating material may be in the form of or be provided as part of a rod, cartridge or cassette or the like which can be inserted into the apparatus. A heater for heating and volatilizing the aerosol generating material may be provided as a "permanent" part of the apparatus.

An aerosol provision device can receive an article comprising aerosol generating material for heating. An "article" in this context is a component that includes or contains in use the aerosol generating material, which is heated to volatilize the aerosol generating material, and optionally other components in use. A user may insert the article into the aerosol provision device before it is heated to produce an aerosol, which the user subsequently inhales. The article may be, for example, of a predetermined or specific size that is configured to be placed within a heating chamber of the device which is sized to receive the article.

Figure 1:
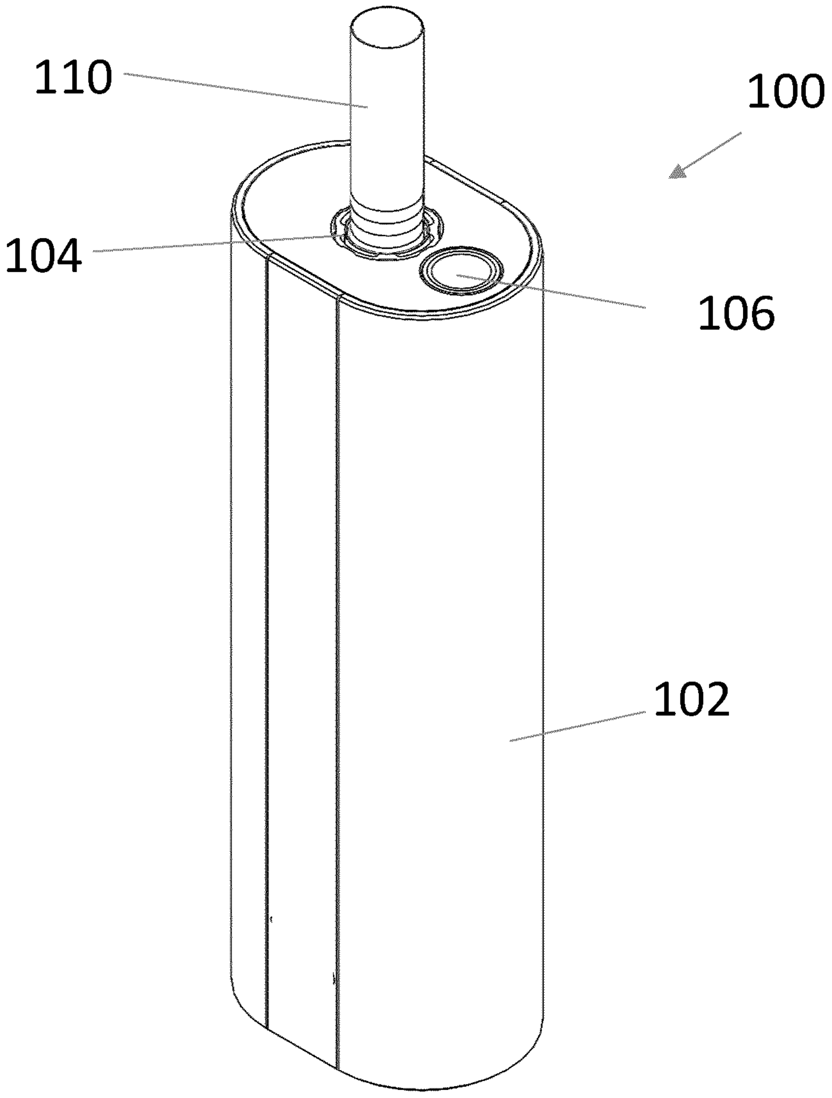
FIG. 1 shows a front view of an example of an aerosol provision device.

FIG. 1 shows an example of an aerosol provision device 100 for generating aerosol from an aerosol generating medium/material. The device 100 can be used to heat a replaceable article 110 comprising the aerosol generating medium, to generate an aerosol or other inhalable medium which can be inhaled by a user of the device 100.

The device 100 comprises a housing 102 which surrounds and houses various components of the device 100. The device 100 has an opening 104 in one end, through which the article 110 can be inserted for heating by the device 100. The article 110 may be fully or partially inserted into the device 100 for heating by the device 100.

The device 100 may comprise a user-operable control element 106, such as a button or switch, which operates the device 100 when operated, e.g. pressed. For example, a user may activate the device 100 by pressing the switch 106.

Figure 2:
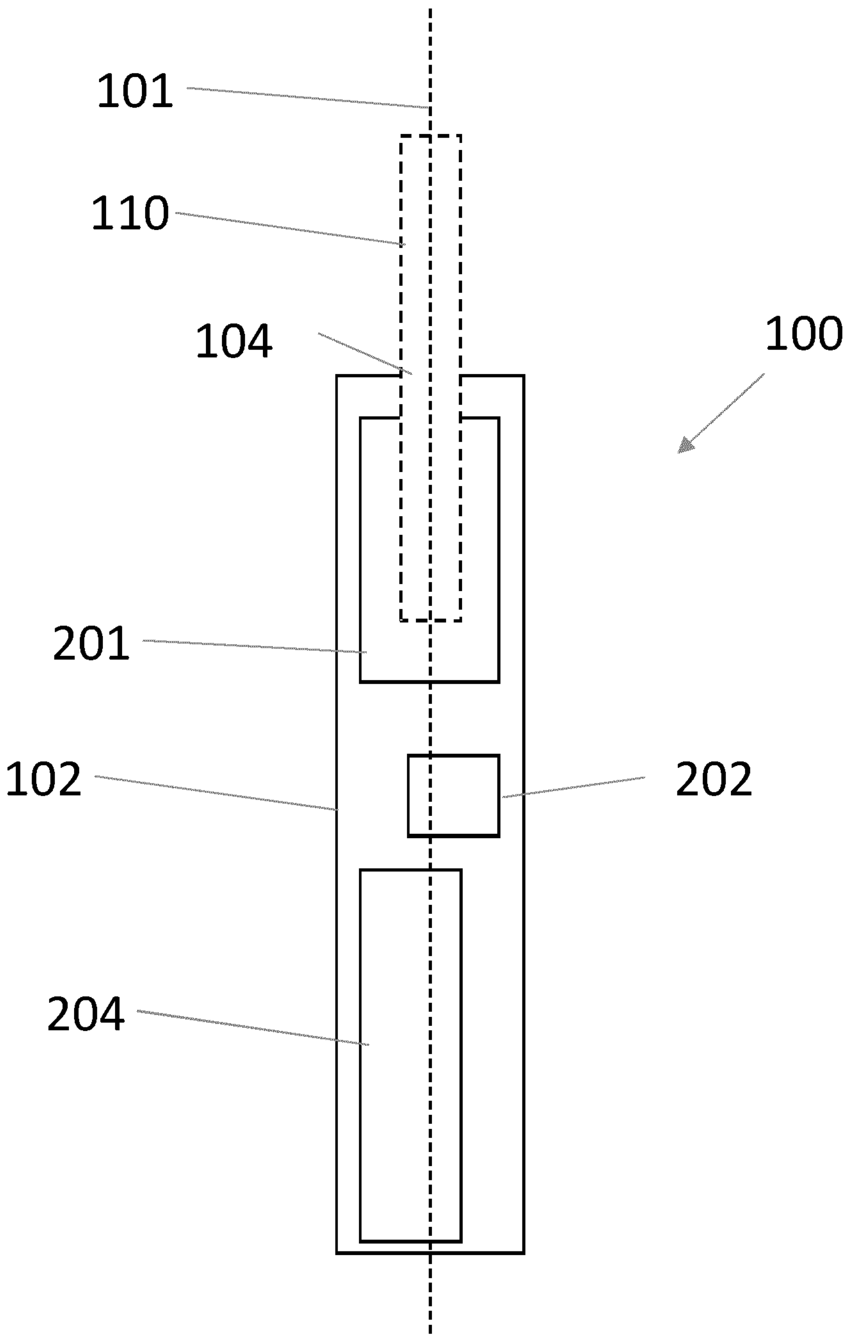
FIG. 2 shows schematically the aerosol provision device of FIG. 1.

FIG. 2 is a schematic illustration of the aerosol provision device 100 of FIG. 1, showing various components of the device 100. It will be appreciated that the device 100 may include other components not shown in FIG. 2.

As shown in FIG. 2, the device 100 includes a heater assembly 201, a power source 204 and a controller (control circuit) 202. The heater assembly 201 is configured to heat the aerosol generating medium of an article 110 inserted into the device 100, such that an aerosol is generated from the aerosol generating medium. The power source 204 supplies electrical power to the heater assembly 201, and the heater assembly 201 converts the supplied electrical energy into heat energy for heating the aerosol generating medium.

The power source 204 may be, for example, a battery, such as a rechargeable battery or a non-rechargeable battery. Examples of suitable batteries include, for example, a lithium battery (such as a lithium-ion battery), a nickel battery (such as a nickel-cadmium battery), and an alkaline battery.

The battery 204 may be electrically coupled to the heater assembly 201 to supply electrical power when required and under control of the controller 202 to heat the aerosol generating material. The control circuit 202 may be configured to activate and deactivate the heater assembly 201 based on a user operating the control element 106. For example, the controller 202 may activate the heater assembly 201 in response to a user operating the switch 106.

The device 100 defines a longitudinal axis 101, along which an article 110 may extend when inserted into the device 100.

The end of the device 100 closest to the opening 104 may be known as the proximal end (or mouth end) of the device 100 because, in use, it is closest to the mouth of the user. In use, a user inserts an article 110 into the opening 104, operates the user control 106 to begin heating the aerosol generating material and draws on the aerosol generated in the device. This causes the aerosol to flow through the device 100 along a flow path towards the proximal end of the device 100.

The other end of the device furthest away from the opening 104 may be known as the distal end of the device 100 because, in use, it is the end furthest away from the mouth of the user. As a user draws on the aerosol generated in the device, the aerosol flows in a direction towards the proximal end of the device 100. The terms proximal and distal as applied to features of the device 100 will be described by reference to the relative positioning of such features with respect to each other in a proximal-distal direction along the axis 101.

Figure 3A:
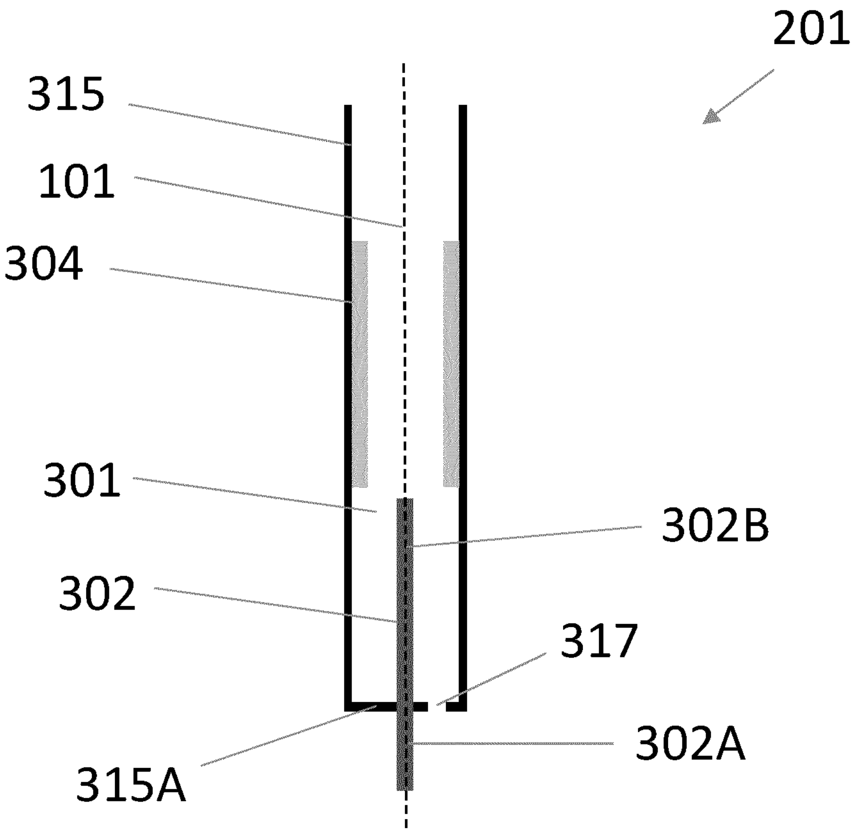
FIGS. 3A and 3B show schematically a heater assembly of an aerosol provision device.
Figure 3B:
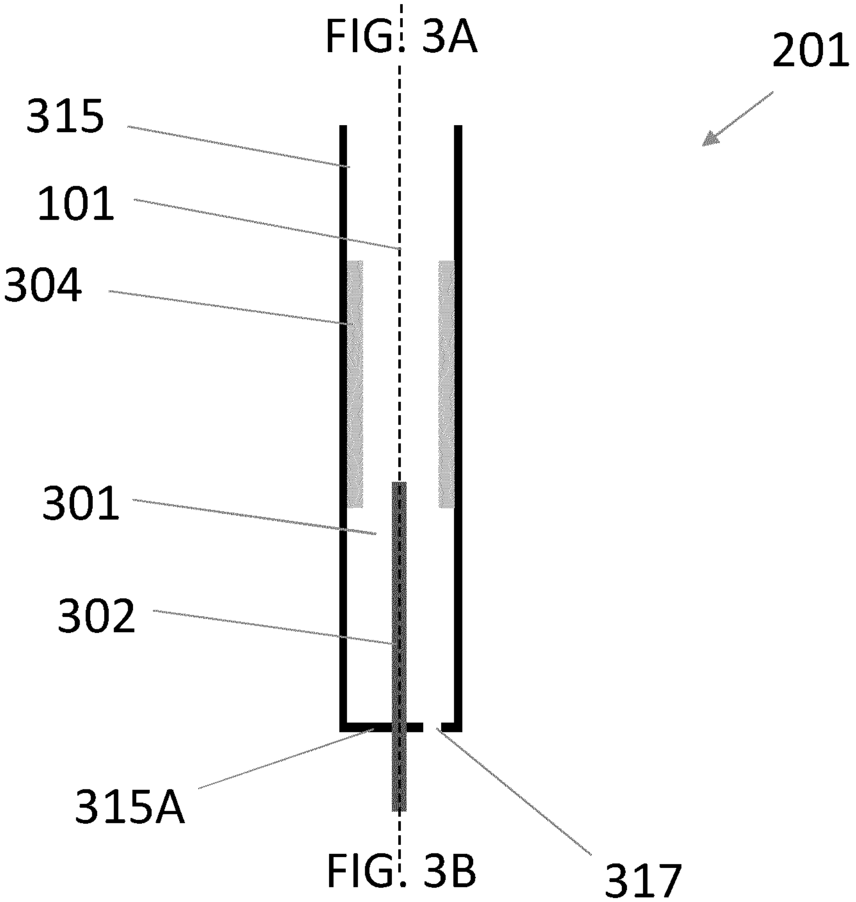

FIGS. 3A and 3B are schematic illustrations of the heater assembly 201 in more detail according to various embodiments. It will be appreciated that the heater assembly 201 may include other components not shown in FIGS. 3A and 3B.

The heater assembly 201 may comprise various components to heat the aerosol generating material of the article 110 via an inductive heating process. Induction heating is a process of heating an electrically conducting heating element (such as a susceptor) by electromagnetic induction. An induction heating assembly may comprise an inductive element, for example, one or more induction coils, and a device for passing a varying electric current, such as an alternating electric current, through the inductive element. The varying electric current in the inductive element produces a varying magnetic field. The varying magnetic field penetrates a susceptor (heating element) suitably positioned with respect to the inductive element, and generates eddy currents inside the susceptor. The susceptor has electrical resistance to the eddy currents, and hence the flow of the eddy currents against this resistance causes the susceptor to be heated by Joule heating. In cases where the susceptor comprises ferromagnetic material such as iron, nickel or cobalt, heat may also be generated by magnetic hysteresis losses in the susceptor, i.e. by the varying orientation of magnetic dipoles in the magnetic material as a result of their alignment with the varying magnetic field. In inductive heating, as compared to heating by conduction for example, heat is generated inside the susceptor, allowing for rapid heating. Further, there need not be any physical contact between the inductive element and the susceptor, allowing for enhanced freedom in construction and application.

Additionally or alternatively, the heater assembly 201 may comprise various components to heat the aerosol generating material of the article 110 via a resistive heating process. In this case, an electrical current is directly applied to a resistive heating element, and the resulting flow of current in the heating element causes the heating element to be heated by Joule heating.

Other heating processes, such as infrared heating, would be possible.

As illustrated in FIG. 3A, the heating assembly 201 includes a heating chamber 301 configured and dimensioned to receive the article 110 to be heated. The heating chamber 301 defines a heating region. In the present example, the article 110 is generally cylindrical, and the heating chamber 301 is correspondingly generally cylindrical in shape. However, other shapes would be possible.

As illustrated in FIG. 3A, the heating chamber 301 may be defined by the inner walls of a support member 315, which may comprise a generally tubular member extending along and around and substantially coaxial with the longitudinal axis 101 of the device 100. The support member 315 (and so heating chamber 301) may be open at its proximal end such that an article 110 inserted into the opening 104 of the device 100 can be received by the heating chamber 301 therethrough. The support member 315 may be closed at its distal end by an end portion 315A. The distal end portion 315A may comprise one or more conduits 317 that form an air passage. In use, the distal end of the article 110 may be positioned in proximity or engagement with the distal end 315A of the heating chamber 301. Air may pass through the one or more conduits 317, into the heating chamber 301, and towards the proximal end of the device 100.

The support member 315 may be formed from an insulating material. For example, the support member 315 may be formed from a plastic, such as polyether ether ketone (PEEK). Other suitable materials are possible. The support member 315 may be formed from such materials ensure that the assembly remains rigid/solid when the heating elements are heating. Using a non-metallic material for the support member 315 may assist with limiting interference with magnetic induction. The support member 315 may be formed from a rigid material to aid support of other components.

Other arrangements for the support member 315 would be possible.

As illustrated in FIG. 3A, the heating assembly 201 comprises a first heating element 302 and a second heating element 304. The first and second heating elements 302, 304 are each configured to heat a respective portion of the heating chamber 301. The portion of the heating chamber 301 that the first heating element 302 heats may overlap or not overlap the portion of the heating chamber 301 that the second heating element 304 heats.

The first heating element 302 may be a first resistive heating element. The second heating element 304 may be a second resistive heating element. The first and/or second resistive heating elements may each comprise resistive material configured to generate heat when a suitable electrical current passes through it, and the heating assembly 201 may comprise electrical contacts for (directly) supplying electrical current to the resistive material of the first and/or second resistive heating elements.

The first heating element may be an induction heating element, i.e. a first susceptor that is heatable by penetration with a varying magnetic field. The second heating element may be an induction heating element, i.e. a second susceptor that is heatable by penetration with a varying magnetic field. In this case, the first and second susceptors each comprise electrically conducting material suitable for heating by electromagnetic induction. For example, the first and/or second susceptor 302, 304 may be formed from a carbon steel. It will be understood that other suitable materials may be used, for example a ferromagnetic material such as iron, nickel or cobalt. As will be discussed further below, in this case, the heating assembly 201 may comprise one or more inductive elements (not shown in FIGS. 3A and 3B), such as one or more induction coils, configured to generate one or more varying magnetic fields that penetrate the first and/or second susceptors so as to cause heating in the first and/or second susceptors.

Other forms of heating element, such as infra-red heating elements, are contemplated.

The first and second heating elements 302, 304 may be formed from the same or different materials.

As illustrated in FIG. 3A, the first heating element 302 may be positioned at the (first) distal end of the heating chamber 301. The first heating element 302 may extend into the heating chamber 301 from the distal end 315A of the heating chamber 301 along the longitudinal axis 101 of the device (in the axial direction). The first heating element 302 and heating chamber 301 may thus be coaxial. It would be possible for the first heating element 302 to extend into the heating chamber 301 e.g. off-axis or not parallel to the axis 101.

As shown in FIG. 3A, the first heating element 302 may comprise a base portion 302A and a protruding portion 302B. The first heating element 302 may be supported at the base portion 302A, and the protruding portion 302B may extend into the heating region 301, and, in use, into the article 110.

The protruding portion 302B of the first heating element 302 may extend into the heating region 301 by any suitable distance. For example, the protruding portion 302B of the first heating element 302 may have an axial length within the heating region (that is, the distance between the distal end of the heating chamber 301 and the proximal end of the first heating element 302) of: (i) 1-5 mm; (ii) 5-10 mm; (iii) 10-15 mm; (iv) 15-20 mm; (v) 20-25 mm; (vi) 25-30 mm; (vii) 30-35 mm; or (viii) 35-40 mm. The axial length of the protruding portion 302B of the first heating element 302 within the heating region may be: i) ≤40 mm; ii) ≤35 mm; iii) ≤30 mm; iv) ≤25 mm; v) ≤20 mm; vi) ≤15 mm; vii) ≤10 mm; or viii) ≤5 mm.

The heating assembly 201 may be configured such that when an article 110 is received by the heating chamber 301, the protruding portion 302B of the first heating element 302 extends into a distal end of the article 110. The protruding portion 302B of the first heating element 302 may thus be positioned, in use, within the article 110. The first heating element 302 may thus be configured to heat aerosol generating material of an article 110 from within, and for this reason be referred to as an inner heating element 302. To facilitate this, the first, inner heating element 302 may be configured to pierce an article 110 that is inserted into the device 100. For example, the protruding portion 302B of the first heating element 302 may comprise a sharp edge or point at its proximal end. For example, the protruding portion 302B of the first heating element 302 may be shaped in a pin or blade shape.

As illustrated in FIG. 3A, the second heating element 304 may be positioned at or towards the (second) proximal end of the heating chamber 301. The second heating element 304 may be a generally tubular member extending along and substantially coaxial with the longitudinal axis 101. The second heating element 304 may extend at least partially around an axial portion of the heating chamber 301. The second heating element 304 may be supported by the support member 315. The second heating element 304 and the support member 315 may be coaxial. The first and second heating elements 302, 304 may be coaxial.

The second heating element 304 may extend continuously around the entire circumference of the heating chamber 301, or only partially extend around the chamber 301. For example, one or more discontinuities, e.g. holes, gaps or slots, may be provided in the second heating element 304.

The second heating element 304 may be configured and dimensioned to extend around an article 110 received by the heating chamber 301. The second heating element 304 may thus be positioned, in use, around an article 110. The second heating element 304 may thus be configured to heat aerosol generating material of the article 110 from outside, and for this reason be referred to as an outer heating element 304. The second, outer heating element 304 may have a circular cross section, e.g. corresponding a circular cross section of the article 110. Other cross sectional shapes would be possible.

The outer heating element 304 and article 110 may be dimensioned so that, in use, the outer surface of the article 110 abuts the inner surface of the outer heating element 304. This can help to ensure that the heating is efficient. In this example, the second heating element 304 protrudes radially inwardly from the support member 315 walls, e.g. such that the article 110 abuts the inner surface of the outer heating element 304 but is spaced radially from the inner surface of the support member 315. However, other arrangements would be possible. For example, the radial inward surface of the second heating element 304 could be flush with the support member 315 walls.

The second heating element 304 may extend along the heating region 301 for any suitable distance. For example, the second heating element 304 may have an axial length of: (i) 1-5 mm; (ii) 5-10 mm; (iii) 10-15 mm; (iv) 15-20 mm; (v) 20-25 mm; (vi) 25-30 mm; (vii) 30-35 mm; or (viii) 35-40 mm. The axial length of the second heating element 304 may be less than, the same as, or greater than, the axial length of the protruding portion 302B of the first heating element 302 within the heating region 301.

Providing both inner 302 and outer 304 heating elements can allow more efficient and effective heating of an article 110, since for example, a lower temperature gradient may be provided across the article 110.

As shown in FIG. 3A, the first and second heating elements 302, 304 are axially offset from each other. The axial offset may be such that the first and second heating elements 302, 304 do not overlap in the axial direction, i.e. such that the second heating element 304 does not surround the first heating element 302 (and the first heating element 302 is not surrounded by the second heating element 304). In this case, the axial distance between the proximal end of the first heating element 302 and the distal end of the second heating element 304 may be less than 10 mm, less than 5 mm, less than 2 mm, less than 1 mm or substantially 0 mm.

FIG. 3B shows an alternative arrangement in which the first and second heating elements 302, 304 overlap in the axial direction. The arrangement of FIG. 3B is otherwise identical to the arrangement of FIG. 3A as discussed herein.

In the example of FIG. 3B, a proximal portion of the first heating element 302 is surrounded by a distal portion of the second heating element 304. In other words, some of the protruding portion 302B of the first heating element 302 is not surrounded by the second heating element 304, and some of the second heating element 304 does not surround the first heating element 302. That is, some but not all of the axial length of the first heating element 302 overlaps some but not all of the axial length of the second heating element 304 in the axial direction.

The majority of the protruding portion 302B of the first heating element 302 may not be surrounded by the second heating element 304. That is, the majority of the axial length of the protruding portion 302B of the) first heating element 302 may not overlap the second heating element 304 in the axial direction. For example, less than 50%, less than 25%, less than 10%, less than 5% or substantially 0% of the axial length of the protruding portion 302B of the first heating element 302 within the heating chamber 301 may overlap the second heating element 304 in the axial direction.

The majority of the second heating element 304 may not surround the first heating element 302. That is, the majority of the axial length of the second heating element 304 may not overlap the first heating element 302 in the axial direction. For example, less than 50%, less than 25%, less than 10%, less than 5% or substantially 0% of the axial length of the second heating element 304 may overlap the first heating element 302 in the axial direction.

Arranging inner and outer heating elements 302, 304 such that there is only a relatively small or no overlap therebetween can provide a relatively long overall heating region, while allowing the inner heating element 302 to be kept relatively short, such that the inner heating element 302 may be able to better withstand forces during insertion and removal of an article 110, for example.

For example, the first and second heating elements 302, 304 together may extend over an axial length that is greater than the axial length of the first heating element 302 and is greater than the axial length of the second heating element 304. For example, the first and second heating elements 302, 304 together may extend over an axial length of: i) >10 mm; ii) >20 mm; iii) >30 mm; iv) >40 mm; v) >50 mm; vi) >60 mm; vii) 70 mm; or viii) >80 mm.

Moreover, arranging inner and outer susceptors such that there is only a relatively small or no overlap therebetween can allow both susceptors to be heated using the same single induction coil in a straightforward manner. This can reduce the number of required components, and simplify the device, for example.

Figure 4:
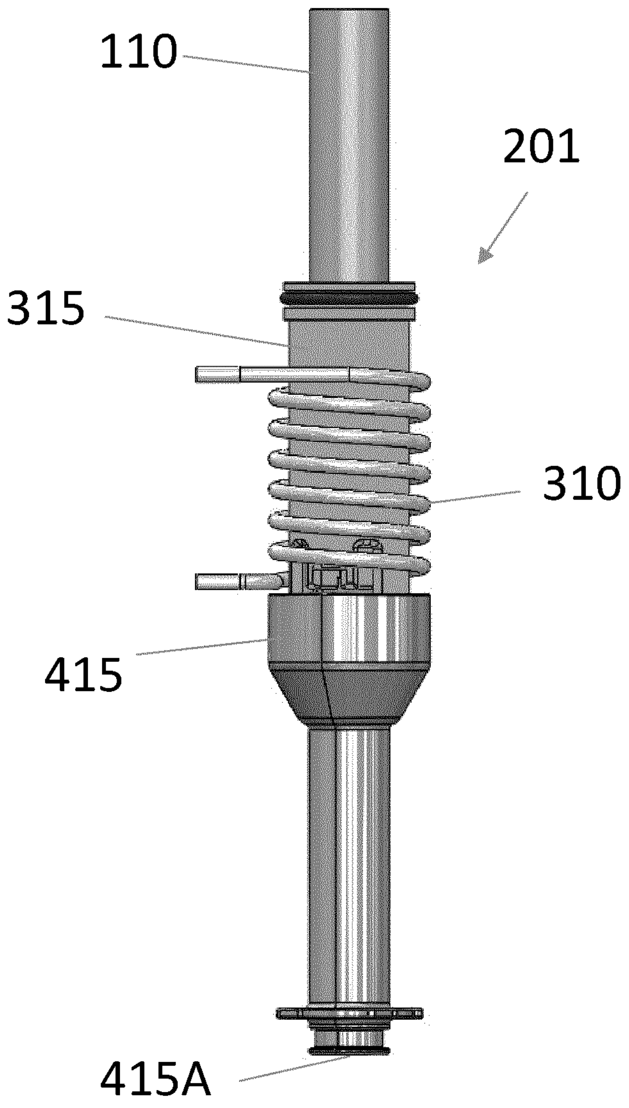
FIG. 4 shows a perspective view of an article received in a heater assembly of an aerosol provision device.

FIG. 4 shows a perspective view of an article 110 received in a heater assembly 201 according to various embodiments. As shown in FIG. 4, the device 100 may comprise an end support 415 at the distal end of the support member 315. The end support 415 may comprise an air inlet 415A at a distal end. An air passage may pass from the air inlet 415A, through the end support 415 and into the heating chamber 301, for example through conduit 317.

In the examples of FIG. 4, the heating assembly 201 is an inductive heating assembly. The heating assembly 201 of this example thus further comprises an inductive element, which in this example is in the form of an induction coil 310. It will be appreciated that in this example, the first heating element 302 is a first susceptor and the second heating element 304 is a second susceptor.

The induction coil 310 may extend around at least a portion of the first susceptor 302 and at least a portion of the second susceptor 304. For example, the induction coil 310 may extend around the entire axial length of both of the first and second susceptors 302, 304. The induction coil 310 may be configured to generate a varying magnetic field that penetrates both the first and second susceptors 302, 304 so as to cause heating in both the first and second susceptors 302, 304.

An induction coil 310 may be a helical coil comprising electrically-conductive material, such as copper. The coil may be formed from wire, such as Litz wire, which is wound helically around the support member 315 and thus the heating chamber 301. Litz wire comprises a plurality of individual wires which are individually insulated and are twisted together to form a single wire. Litz wires are designed to reduce the skin effect losses in a conductor. Other wire types could be used, such as solid.

The induction coil 310 may extend around, and be supported by, the support member 315. The induction coil 310 may thus extend around a portion of the heating chamber

301. The induction coil 310 may be arranged coaxially with the support member 315 and heating chamber 301 (and longitudinal axis 101).

Where some of the first susceptor 302 is surrounded by the second susceptor 304, at least the portion of the second susceptor 304 that surrounds the first susceptor 302 may comprise one or more discontinuities, e.g. holes, gaps or slots, which are configured allow the varying magnetic field to pass therethrough and reach the first susceptor 302 with sufficient strength to cause the desired heating.

Figure 5A:
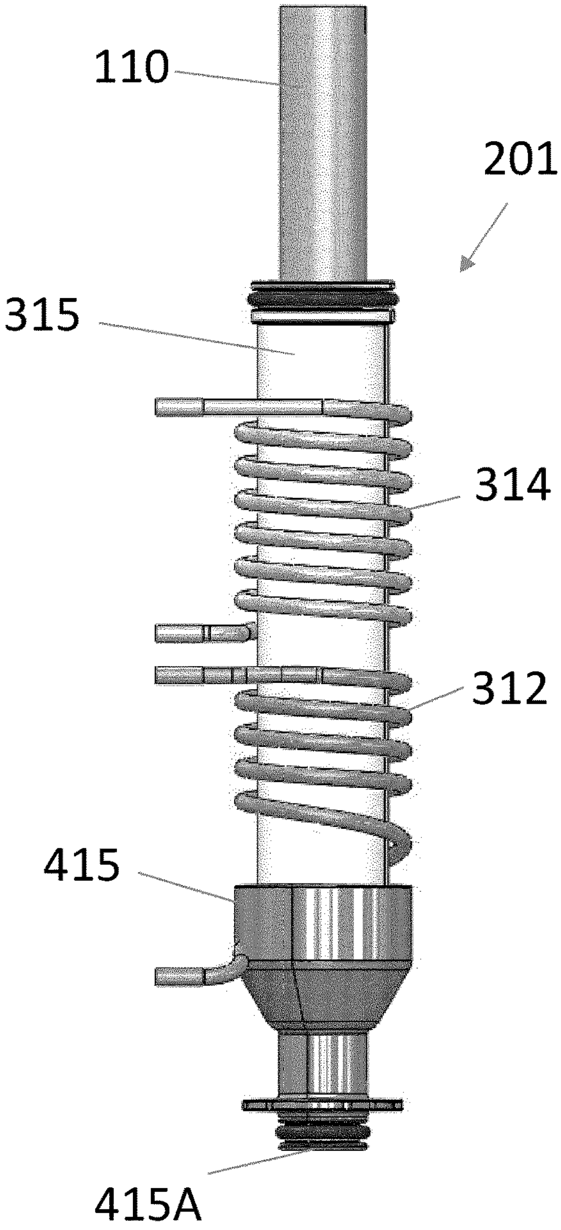
FIG. 5A shows a perspective view and FIG. 5B shows a cross-sectional view of an article received in a heater assembly of an aerosol provision device.
Figure 5B:
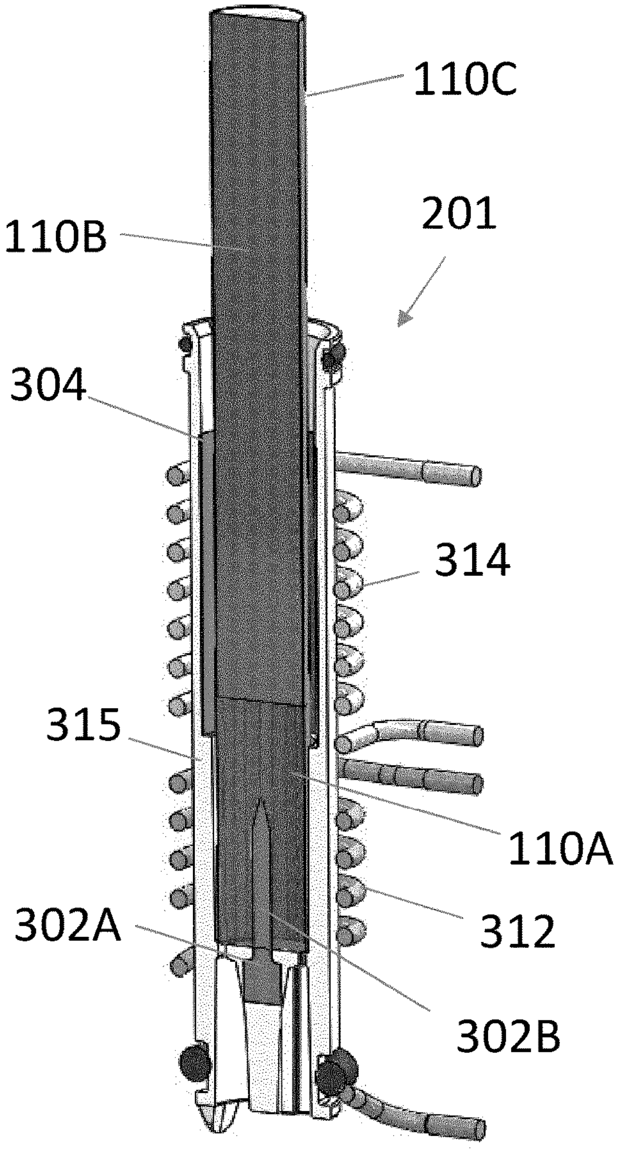

FIG. 5 illustrates an alternative inductive heating arrangement in which the heating assembly 201 comprises a first induction coil 312 and a second induction coil 314. FIG. 5A shows a perspective view and FIG. 5B shows a cross-sectional view of an article 110 received in a heater assembly 201 according to various embodiments.

As can be seen in FIG. 5B, the first induction coil 312 may extend around at least a portion of the first susceptor 302, and the second induction coil 314 may extend around at least a portion of the second susceptor 304. The first induction coil 312 may be configured to generate a first varying magnetic field that penetrates the first susceptor 302 so as to cause heating in the first susceptor 302. The second induction coil 314 may be configured to generate a second varying magnetic field that penetrates the second susceptor 304 so as to cause heating in the second susceptor 304.

The first and second induction coils 312, 314 may be axially displaced from each other along the longitudinal axis 101, such that a greater axial length of the first susceptor 302 is surrounded by the first induction coil 312 than is surrounded by the second induction coil 314, and such that a greater axial length of the second susceptor 304 is surrounded by the second induction coil 314 than is surrounded by the first induction coil 312.

This means that the first varying magnetic field generated by the first induction coil 312 may cause a greater increase in temperature in the first susceptor 302 than in the second susceptor 304. Similarly, the second varying magnetic field generated by the second induction coil 314 may cause a greater increase in temperature in the second susceptor 304 than in the first susceptor 302. For example, the first varying magnetic field may cause only a negligible increase, or substantially no increase, in temperature in the second susceptor 304, but a non-negligible temperature increase in the first susceptor 302. The second varying magnetic field may cause only a negligible increase, or substantially no increase, in temperature in the first susceptor 302, but a non-negligible temperature increase in the second susceptor 304.

In embodiments, at least part of the first susceptor 302 may be surrounded by the second susceptor 304. The at least the portion of the second susceptor 304 that surrounds the first susceptor 302 may comprise one or more discontinuities, e.g. holes, gaps or slots, which are configured to allow the first varying magnetic field to pass therethrough and reach the first susceptor 302 with sufficient strength to cause the desired heating. The one or more discontinuities may extend along only part of the second susceptor 304. The one or more discontinuities in embodiments extend over the at least part of the second susceptor 304 that overlaps the at least part of the first susceptor 302.

The first and second induction coils 312, 314 may be substantially the same, or may have at least one characteristic different from each other. For example, the first and second induction coils 312, 314 may have substantially the same or different values of inductance, axial lengths, radii, pitches, numbers of turns, etc. The first and second induction coils 312, 314 may be wound in the same or opposite directions. Winding the coils in opposite directions can help to reduce the current induced by one coil in the other coil.

As shown in FIGS. 5A and 5B, in this example the first susceptor 302 is shorter in the axial direction than the second susceptor 304. The axial lengths of the induction coils 312, 314 may correspond to the axial lengths of the respective susceptors 302, 304. Thus, as shown in FIGS. 5A and 5B, in this example the first induction coil 312 has fewer turns, and has a shorter axial length, than the second induction coil 314. In this example, the protruding portion 302B of the first susceptor 302 has a blade shape.

As shown in FIG. 5B, the article 110 may comprise a first distal segment 110A comprising aerosol generating material, and a second proximal segment 110B. The aerosol generating material may be non-liquid aerosol generating material, for example comprising tobacco. The second proximal segment 110B may comprise a filtering and/or cooling structure and/or a mouthpiece. The first and second segments of the article 110 may be wrapped in a wrapper 110C.

As shown in FIG. 5B, in use, the protruding portion 302B of the first heating element 302 may extend into the first segment 110A of the article 110. The axial lengths of the first segment 110A and the protruding portion 302B of the first heating element 302 may be such that the protruding portion 302B of the first heating element 302 does not extend into the second segment 110B of the article 110.

As also shown in FIG. 5B, in use, the second heating element 304 may surround at least some of the first segment 110A of the article 110. The second heating element 304 may also surround at least some of the second segment 110B of the article 110. However, it would be possible for the second heating element 304 to not surround the second segment 110B of the article 110.

Figure 6:
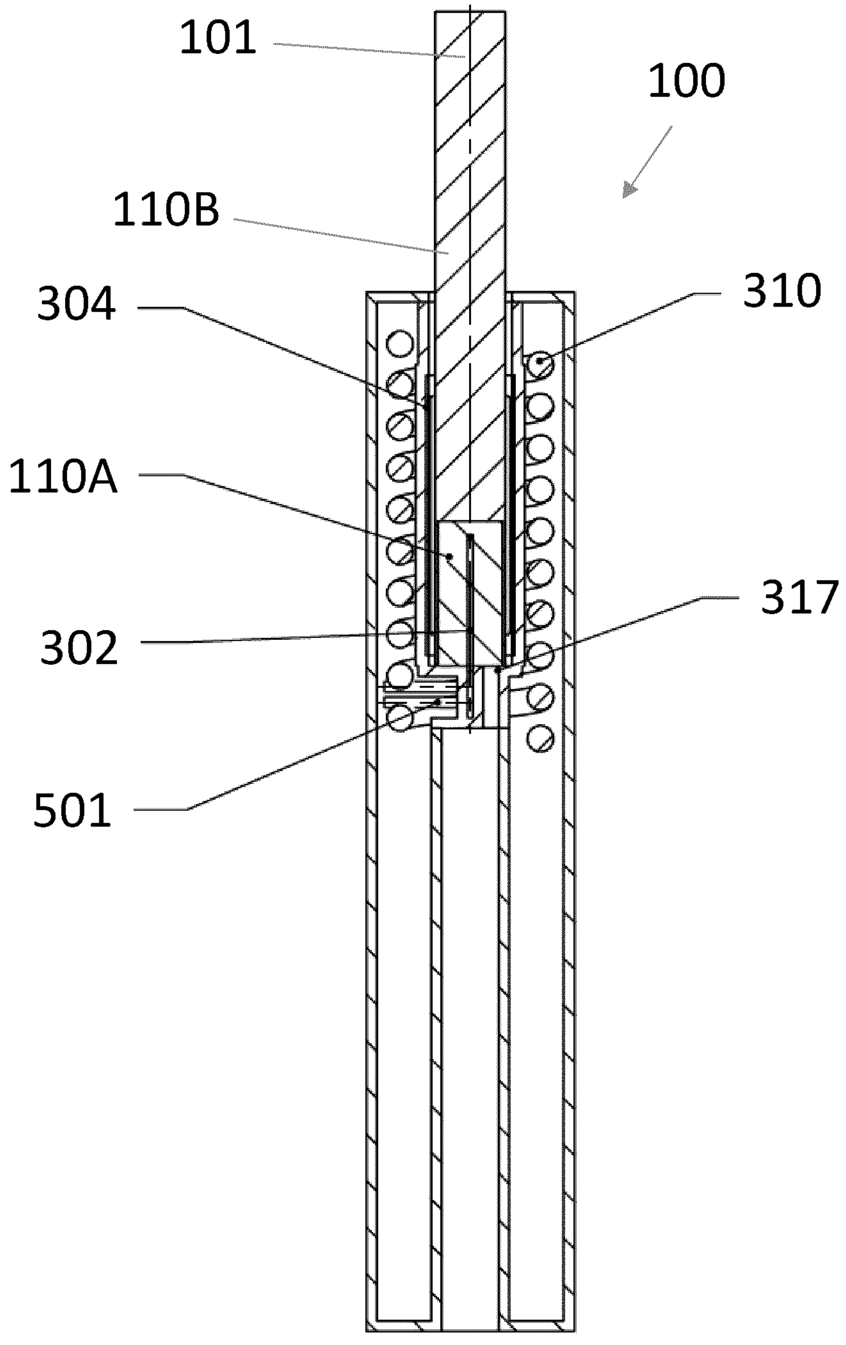
FIG. 6 shows a cross-sectional view of an article received in a heater assembly of an aerosol provision device.

FIG. 6 shows a cross-sectional view of an article 110 received in an aerosol generating device 100 according to various embodiments in which the heating assembly 201 is an inductive heating assembly comprising a single induction coil 310. FIG. 6 shows a plane parallel to the longitudinal axis 101.

As shown in FIG. 6, the device 100 may comprise one or more temperature sensors, such as at least one thermocouple 501. The thermocouple 501 may be configured to determine a temperature indicative of the temperature of the first and/or second heating elements 302, 304. The determined temperature information may be provided to the controller 202, e.g. so as to provide a feedback mechanism for achieving the desired heating.

Figure 7A:
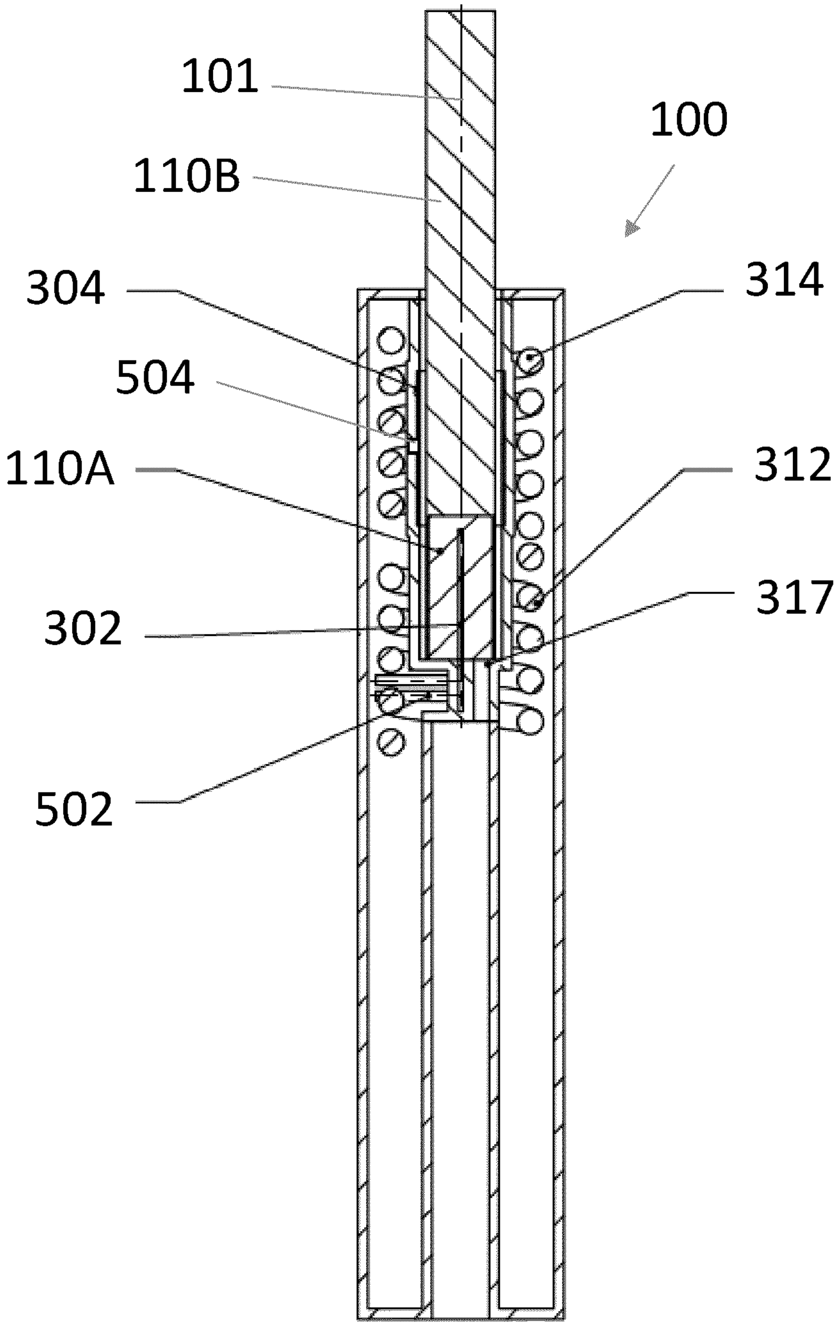
FIGS. 7A and 7B show cross-sectional views of an article received in a heater assembly of an aerosol provision device.
Figure 7B:
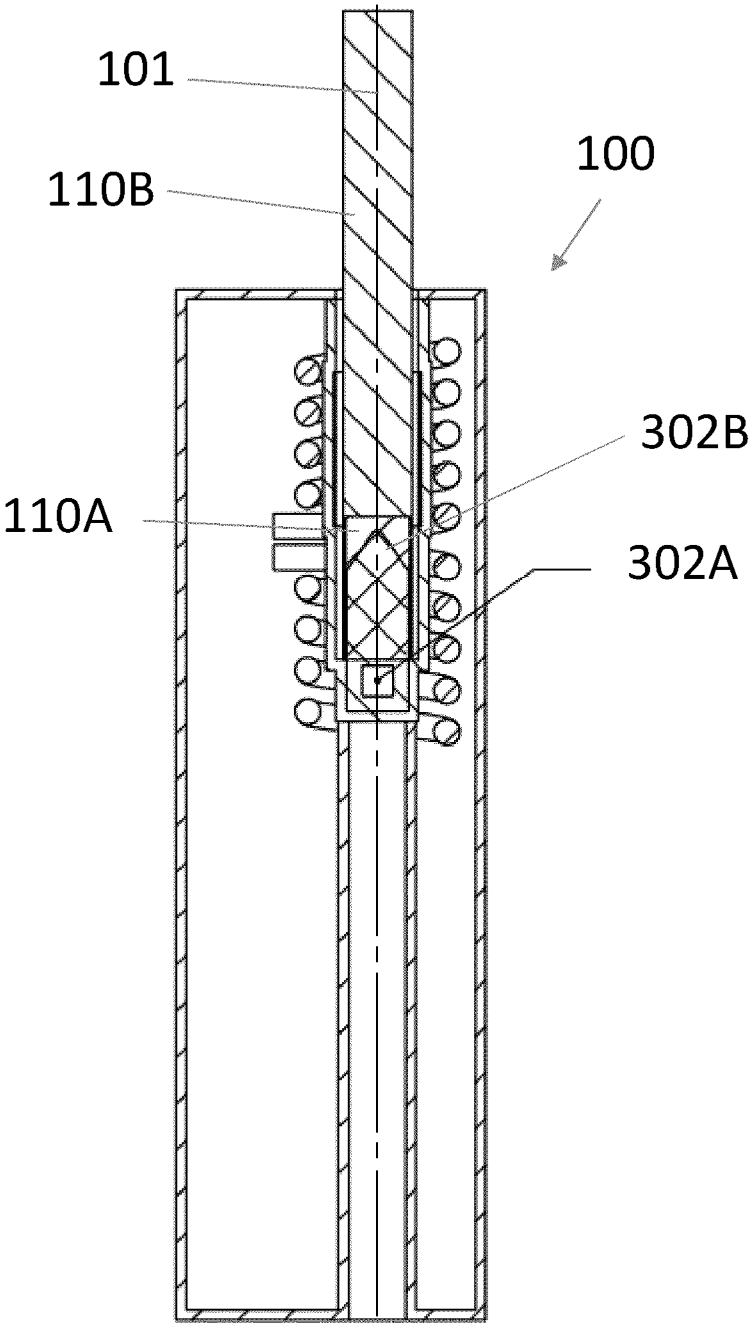

FIGS. 7A and 7B show cross-sectional views of an article 110 received in an aerosol generating device 100 according to various embodiments in which the heating assembly 201 is an inductive heating assembly comprising first and second induction coils 312, 314. FIG. 7A shows a first plane parallel to the longitudinal axis 101, and FIG. 7B shows a second plane parallel to the longitudinal axis 101 that is perpendicular to the first plane.

As shown in FIG. 7A, the device 100 may comprise two independent temperature sensors, for example two thermocouples, a first 502 one of which is configured to determine a temperature indicative of the temperature of the first heating element 302, and a second 504 of which is configured to determine a temperature indicative of the temperature of the second heating element 304. The determined temperature information may be provided to the controller 202 so as to provide a feedback mechanism for independent control of the first and second heating elements 302, 304. For example, a first control circuit of the controller 202 may control the first heating element 302 or induction coil 312 based on the temperature information for the first heating element 302, and a second control circuit of the controller 202 may control the second heating element 304 or induction coil 314 based on the temperature information for the second heating element 304.

Thus, in various embodiments, the first and second heating elements 302, 304 are independently controllable by the controller 202.

For example, the controller 202 may cause the first and second heating elements 302, 304 to be heated to the same or different temperatures and/or such that the first and second heating elements 302, 304 are heated according to the same or different temperature-time profiles. For example, the heating elements 302, 304 may be active at different times. For example, initially, the first heating element 302 may be operating to heat a first section of the article 110, and at a later time, the second heating element 304 may be operating to heat a second section of the article 110 (or vice versa).

In embodiments, the first heating element 302 is fixedly connected to the device 100 such that it extends within the heating region at a fixed position with respect to the second heating element 304. In these embodiments, the first heating element 302 may extend into an article 110 when the article 110 is received by the heating region. In other embodiments, however, the first heating element 302 may be provided within an article 110 that is to be inserted into the device 100. In these embodiments, the first heating element 302 may be moveable with respect to the second heating element 304. In these embodiments, the first heating element 302 may extend within the heating region when the article 110 is received by the heating region.

The above embodiments are to be understood as illustrative examples of the disclosure. Further embodiments of the disclosure are envisaged. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

The invention claimed is:

1. An aerosol provision device heating system, comprising:
- a heating region configured to receive at least a portion of an article comprising aerosol generating material;
- a first heating element that extends within a first portion of the heating region, the first heating element being heatable to heat the first portion of the heating region; and
- a second heating element that at least partially surrounds a second portion of the heating region, the second heating element being heatable to heat the second portion of the heating region;
- wherein at least part of the first heating element extending within the heating region is offset from the second heating element, and
- wherein at least part of the first heating element is surrounded by the second heating element.

2. The heating system of claim 1, wherein the first heating element defines a longitudinal axis, and the at least part of the first heating element extending within the heating region is offset in an axial direction from the second heating element.

3. The heating system of claim 1, wherein the first heating element and the second heating element are coaxial.

4. The heating system of claim 1, wherein the first heating element is configured to extend into an article received by the heating region.

5. The heating system of claim 1, wherein the first heating element comprises a sharp edge or a point at a free end.

6. The heating system of claim 1, wherein the second heating element is configured to extend around at least a portion of an article received by the heating region.

7. The heating system of claim 1, further comprising a receptacle defining the heating region, wherein the receptacle has a base defining an end of the heating region and a peripheral wall.

8. The heating system of claim 7, wherein the first heating element upstands from the base.

9. The heating system of claim 7, wherein the peripheral wall comprises a support member and the second heating element.

10. The heating system of claim 1, wherein the at least a part of the first heating element extending within the heating region that is offset from the second heating element is arranged at an end of the heating region.

11. The heating system of claim 1, wherein the at least a part of the first heating element extending within the heating region that is offset from the second heating element is at least a majority of the first heating element extending within the heating region.

12. The heating system of claim 1, wherein at least a majority of the second heating element is offset from the first heating element.

13. An aerosol provision device heating system, comprising:
- a heating region configured to receive at least a portion of an article comprising aerosol generating material;
- a first heating element that extends within a first portion of the heating region, the first heating element being heatable to heat the first portion of the heating region; and
- a second heating element that at least partially surrounds a second portion of the heating region, the second heating element being heatable to heat the second portion of the heating region;
- wherein at least a majority of the second heating element is offset from the first heating element, and
- wherein at least part of the first heating element is surrounded by the second heating element.

14. The heating system of claim 13, wherein the first heating element is arranged at a first end of the heating region, and the at least the majority of the second heating element that is offset from the first heating element is arranged at or towards a second end of the heating region.

15. The heating system of claim 1, wherein the first heating element extends over at least a first distance between an end of the heating region and an end of the first heating element, the second heating element extends over a second distance between a first end of the second heating element and a second end of the second heating element, and the first heating element and the second heating element are offset from each other such that a distance from the end of the heating region to the second end of the second heating element is greater than the first distance and is greater than the second distance.

16. The heating system of claim 1, wherein the first heating element comprises a first susceptor heatable by penetration with a varying magnetic field, and the second heating element comprises a second susceptor heatable by penetration with a varying magnetic field.

17. The heating system of claim 16, further comprising an inductor coil configured to generate the varying magnetic field that penetrates the first susceptor and the second susceptor.

18. The heating system of claim 16, further comprising a first induction coil configured to generate a first varying magnetic field that penetrates the first susceptor, and a second induction coil configured to generate a second varying magnetic field that penetrates the second susceptor.

19. The heating system of claim 1, further comprising a control circuit configured to independently control the first heating element and the second heating element.

20. An aerosol provision device comprising the heating system of claim 1.

21. An aerosol provision system comprising the aerosol provision device of claim 20, and an article comprising aerosol generating material.

22. The heating system of claim 12, wherein the first heating element is arranged at a first end of the heating region, and the at least the majority of the second heating element that is offset from the first heating element is arranged at or towards a second end of the heating region.

* * * * *